(12) United States Patent
Lee (10) Patent No.: US 6,917,389 B2
(45) Date of Patent: Jul. 12, 2005

(54) LINEARIZATION COMPENSATION SYSTEM OF DIGITAL TV RELAY APPARATUS AND METHOD THEREOF

(75) Inventor: Ji Won Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 10/025,571

(22) Filed: Dec. 26, 2001

(65) Prior Publication Data
US 2002/0113905 A1 Aug. 22, 2002

(30) Foreign Application Priority Data
Dec. 28, 2000 (KR) .................................. 2000-83721

(51) Int. Cl.$^7$ .......................... H04N 5/38; H04N 5/40; H04N 5/21; H04N 5/455
(52) U.S. Cl. ...................... 348/608; 348/193; 348/723; 375/229; 375/296; 455/114.2; 455/114.3; 455/115.1; 455/115.3; 455/126
(58) Field of Search .................. 348/180, 192–3, 348/608, 723–24; 375/295–296, 278, 285, 229; 455/110, 112, 114.2–114.3, 115.1–115.3, 118, 126, 127.2; H04N 5/38, 5/40, 5/21, 5/455

(56) References Cited

U.S. PATENT DOCUMENTS

| 5,732,333 | A | * | 3/1998 | Cox et al. .................... 455/126 |
| 5,920,808 | A | * | 7/1999 | Jones et al. ............... 455/127.1 |
| 6,081,158 | A | * | 6/2000 | Twitchell et al. ........... 330/149 |
| 6,141,390 | A | * | 10/2000 | Cova .......................... 375/297 |
| 6,246,686 | B1 | * | 6/2001 | Ha-Duong et al. ....... 370/395.3 |
| 6,281,936 | B1 | * | 8/2001 | Twitchell et al. ........... 348/470 |
| 6,285,412 | B1 | * | 9/2001 | Twitchell .................... 348/608 |
| 6,320,913 | B1 | * | 11/2001 | Nakayama .................. 375/297 |
| 6,335,767 | B1 | * | 1/2002 | Twitchell et al. ........... 348/608 |
| 6,473,133 | B1 | * | 10/2002 | Twitchell et al. ........... 348/608 |
| 6,501,805 | B1 | * | 12/2002 | Twitchell .................... 375/285 |
| 6,515,712 | B1 | * | 2/2003 | Jeong .......................... 348/608 |
| 6,519,010 | B2 | * | 2/2003 | Twitchell et al. ........... 348/608 |
| 6,570,444 | B2 | * | 5/2003 | Wright ........................ 330/149 |
| 6,587,514 | B1 | * | 7/2003 | Wright et al. ............... 375/296 |
| 6,600,516 | B1 | * | 7/2003 | Danielsons et al. ......... 348/608 |
| 6,600,792 | B2 | * | 7/2003 | Antonio et al. ............. 375/297 |
| 6,633,200 | B2 | * | 10/2003 | Kolanek ...................... 330/149 |
| 6,650,374 | B2 | * | 11/2003 | Choi et al. .................. 348/723 |
| 6,674,808 | B1 | * | 1/2004 | Griph et al. ................. 375/285 |
| 6,697,436 | B1 | * | 2/2004 | Wright et al. ............... 375/296 |
| 6,711,217 | B1 | * | 3/2004 | Jeong .......................... 375/297 |
| 6,798,843 | B1 | * | 9/2004 | Wright et al. ............... 375/296 |
| 2002/0027958 | A1 | * | 3/2002 | Kolanek ...................... 375/297 |
| 2002/0064236 | A1 | * | 5/2002 | Matsuoka et al. ........... 375/296 |

\* cited by examiner

Primary Examiner—Brian P. Yenke
(74) Attorney, Agent, or Firm—Fleshner & Kim, LLP (57) ABSTRACT

A linear compensation system of a digital TV relay or other apparatus preferably includes a transmitting unit configured to modulate a data to an intermediate frequency (IF) signal, up convert the IF signal to an RF signal, and amplify the RF signal to a predetermined level using a high power amplifier (HPA). The system also includes a linear compensation unit to preferably directly vary a step size of an adaptive equalizer according to whether a signal-to-noise ratio (SNR) or an error vector magnitude (EVM) for an output signal of the HPA satisfies an advanced television systems committee (ATSC) or other standard. The linear compensation unit is thus configured to output an improved linear compensation coefficient to a modulator of the transmitting unit.

24 Claims, 5 Drawing Sheets

LINEARIZATION COMPENSATION SYSTEM OF DIGITAL TV RELAY APPARATUS AND METHOD THEREOF

BACKGROUND OF THE INVENTION

1. Field of the Invention

The present invention relates to a digital television relay apparatus, and more particularly, to a linearization compensation system of a digital TV relay apparatus for compensating a non-linearity of a high power amplifier, and methods thereof.

2. Background of the Related Art

In general, a digital TV relay apparatus services a radio shadow area that a digital broadcast transmitter fails to cover. Thus, a digital TV relay improves the viewing range of a digital TV broadcast service.

A receiving terminal of the digital TV relay apparatus down-converts a broadcast signal transmitted from a digital TV transmitter into an intermediate frequency and transmits it to a transmitting terminal of the digital TV relay. Then, the transmitting terminal modulates the intermediate frequency to a channel frequency, amplifies it to a predetermined level and transmits it to a general subscriber located in the radio shadow area.

The broadcast signal outputted from the transmitting terminal of the digital TV relay is a signal that has been amplified by a high power amplifier. Typically, the output of a high power amplifier is non-linear over a range of input voltages at a given frequency.

Figure 1:
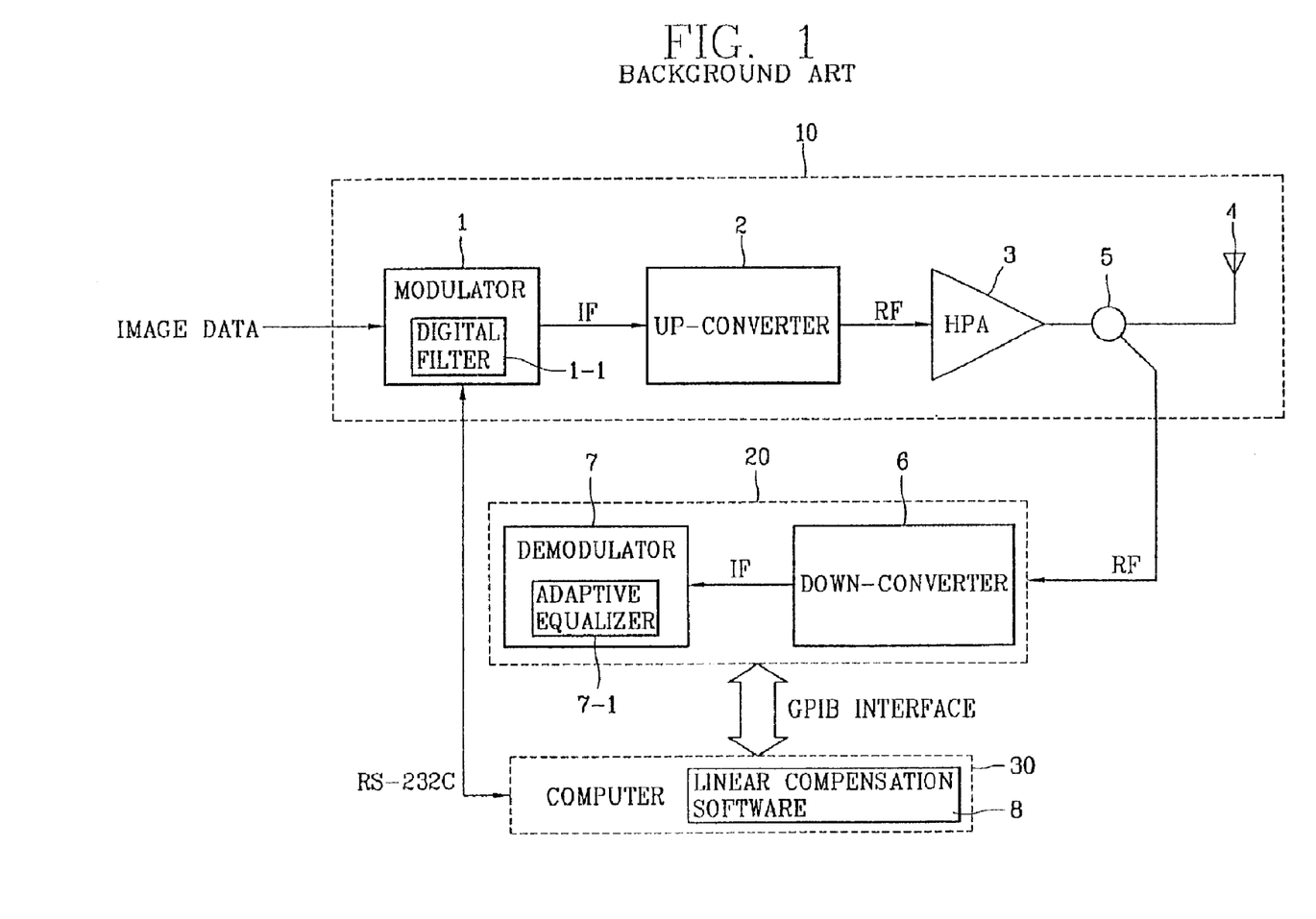
FIG. 1 is a schematic block diagram of a linear compensation system of a digital TV relay apparatus in accordance with the related art.

FIG. 1 is a schematic block diagram of a linearization compensation system of a digital TV relay apparatus in accordance with the related art. As shown therein, the linearization compensation system of the digital TV relay apparatus includes a transmitting unit 10 to modulate an image data into an intermediate frequency (IF) signal, amplify the intermediate frequency signal by a high power amplifier (HPA) and transmit it. The linearizer further includes a vector signal analyzer 20 to optimize the output signal of the HPA and generate an equalizer coefficient. The linearizer also includes a computer 30 to receive the equalizer coefficient from the vector signal analyzer 20 and generate a linear compensation coefficient using internal linear compensation software and output the linear compensation coefficient to the modulator of the transmitting unit 10.

The transmitting unit 10 includes a modulator 1 to modulate an image data to an IF signal according to the linear compensation coefficient outputted from the computer 30. The transmitting unit 10 also includes an up-converter 2 to convert the IF signal outputted from the modulator 1 into a radio frequency (RF) signal, and an HPA 3 to amplify the RF signal outputted from the up-converter 2 and output it through an antenna 4.

The modulator 1 includes a digital filter 1-1 to remove an interference through a channel coding, insert a pilot signal and generate a waveform.

The vector signal analyzer 20 includes a down-converter 6 to convert the output signal of the HPA 3 into an IF signal, and a demodulator 7 to demodulate the IF signal outputted from the down-converter 6 into a digital I/Q baseband signal. The demodulator 7 includes an adaptive equalizer 7-1 to generate an equalizer coefficient of the digital I/Q signal by using an adaptive equalization algorithm.

The operation of the related art linear compensation system of a digital TV relay apparatus constructed as described above will now be described with reference to FIG. 1. When broadcast data is inputted, the modulator 1 modulates a baseband broadcast signal of an MPEG stream into an IF signal. The digital filter 1-1 of the modulator 1 distorts the broadcast signal by using an initial linear compensation coefficient so that the broadcast signal may have an inverse characteristic to the non-linear characteristic of the HPA 3.

The up converter 2 converts the IF signal outputted from the modulator 1 into a broadcast frequency, that is, an RF signal, which is determined by broadcasting stations. Accordingly, the RF signal is amplified to a prescribed level by the HPA 3 and transmitted as a digital TV signal through the antenna 4 to a general subscriber.

If the modulator 1 is ideally operated, the characteristic of the digital filter 1-1 and the non-linear characteristic of the HPA 3 would be offset, and an output signal of the HPA 3 would not have a distortion component. However, it is not possible for the digital filter 1-1 to have the exact inverse characteristic to the non-linear characteristic of the HPA 3. Thus, a distortion component is included in the output signal of the HPA 3. Accordingly, an operator who operates the transmitter and the relay apparatus must compensate for the non-linearity of the digital TV signal outputted through the HPA 3 by using the vector signal analyzer 20 and the computer 30.

When the operator operates the linear compensation units (the vector signal analyzer 20 and the computer 30), the RF signal outputted from the HPA 3 is inputted through a coupler 5 to the vector signal analyzer 20. The down-converter 6 of the vector signal analyzer 20 converts the input RF signal into an IF signal and outputs the IF signal the demodulator 7. Then, the demodulator 7 converts the inputted IF signal into a digital I/Q signal of a baseband and inputs it to the adaptive equalizer 7-1. The adaptive equalizer 7-1 generates an equalizer coefficient to optimize the digital I/Q signal by using the adaptive equalization algorithm.

The adaptive equalization algorithm performs optimizing by using a fixed convergence constant (a step size) set by the operator. Accordingly, as the digital I/Q signal is processed by the adaptive equalizer 7-1, a signal-to-noise ratio (SNR) of the digital I/Q signal is improved. An operator may visually confirm the optimization of the digital I/Q signal using the vector signal analyzer 20.

After the optimization of the digital signal I/Q is confirmed, the operator clicks a prescribed button to transmit the 31 coefficients of the adaptive equalizer through a general purpose interface bus (GPIB) to the computer 30. The computer 30 converts the received 31 equalizer coefficients into 288 linear compensation coefficients by using the linear compensation software 8 and outputs them through the RS-232C cable to the digital filter 1-1 of the modulator 1.

The digital filter 1-1 distorts the broadcast signal by using the changed linear compensation coefficients outputted from the computer 30, so that a clear digital TV signal without distortion is transmitted through the antenna 4.

The apparatus and method of the related art have various problems. For example, in the related art linear compensation system, the adaptive equalizer 7-1 performs the adaptive equalization algorithm by using the fixed convergence constant (the step size) selected by the operator. However, because the operator can not accurately determine the convergence speed of the adaptive equalizer according to the value of the step size, he or she repeatedly changes the step size value. As a result, the convergence (or optimization) time is very long in the related art linear compensation system of a digital TV relay apparatus. In addition, in the related art linear compensation system of a digital TV relay apparatus, the operator must change the step size value by increments of one. Each time, the equalizer coefficient must be transmitted to the computer 30. Moreover, in the related art linear compensation system of a digital TV relay apparatus, an expensive vector signal analyzer 20 is required.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a linear compensation system of a digital TV relay apparatus and method of operating same that compensates for non-linear characteristics of a digital TV transmitter or relay.

Another object of the present invention is to provide a linear compensation system of a digital TV relay apparatus and method of operating same that is capable of automatically compensating for a non-linear characteristic of a high power amplifier (HPA) for use in a digital TV transmitter or in a digital TV relay apparatus.

Another object of the present invention is to provide a linear compensation system of a digital TV relay apparatus and method of operating same that is capable of effectively compensating the non-linear characteristic of the HPA.

Another object of the present invention is to provide a linear compensation system of a digital TV relay apparatus that is capable of shortening linear compensation time.

In order to achieve at least the above objects in whole or in part and in accordance with the purpose of the invention, as embodied and broadly described, there is provided a linear compensation system that includes a transmitting unit configured to modulate a data to a first intermediate frequency (IF) signal, up convert the first IF signal to an RF signal, amplify the RF signal to a predetermined level using a power amplifier (PA) and transmit the amplified RF signal, and a linear compensation unit configured to vary a step size of an adaptive equalizer according to whether a signal-to-noise ratio (SNR) for an output signal of the PA satisfies a prescribed standard, and output a selected linear compensation coefficient to the modulator.

To further achieve at least the above objects in whole or in part and in accordance with the purpose of the invention, as embodied and broadly described, there is provided a linear compensation system that includes a transmitting unit configured to modulate an image data to a first intermediate frequency (IF) signal, up convert the first signal to an RF signal, amplify the RF signal to a prescribed level using a high powered amplifier (HPA), and transmit the amplified RF signal, a correction circuit configured to convert the output signal of the HPA to a digital I/Q signal, and a computer configured to receive the digital I/Q signal outputted from the correction circuit, update a step size of an adaptive equalizer according to one of an SNR for the output signal of the adaptive equalizer and an error vector magnitude value (EVM), and output a linear compensation coefficient.

To further achieve at least the above objects in whole or in part and in accordance with the purpose of the invention, as embodied and broadly described, there is provided a linear compensating method in which an image data is modulated into an intermediate frequency (IF) signal by a modulator, converted to an RF signal, amplified to a prescribed level and outputted by an HPA, including determining whether a first SNR for an output signal of the HPA satisfies a standard, computing an error value average for an output signal of an adaptive equalizer, fixing the computed error value average as a step size of the adaptive equalizer when the computed error value average is in a predetermined range, computing a second SNR, and converting a coefficient of the adaptive equalizer and compensating a non-linearity of the HPA where one of the second SNR and the EVM satisfy the standard by more than a predetermined number.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
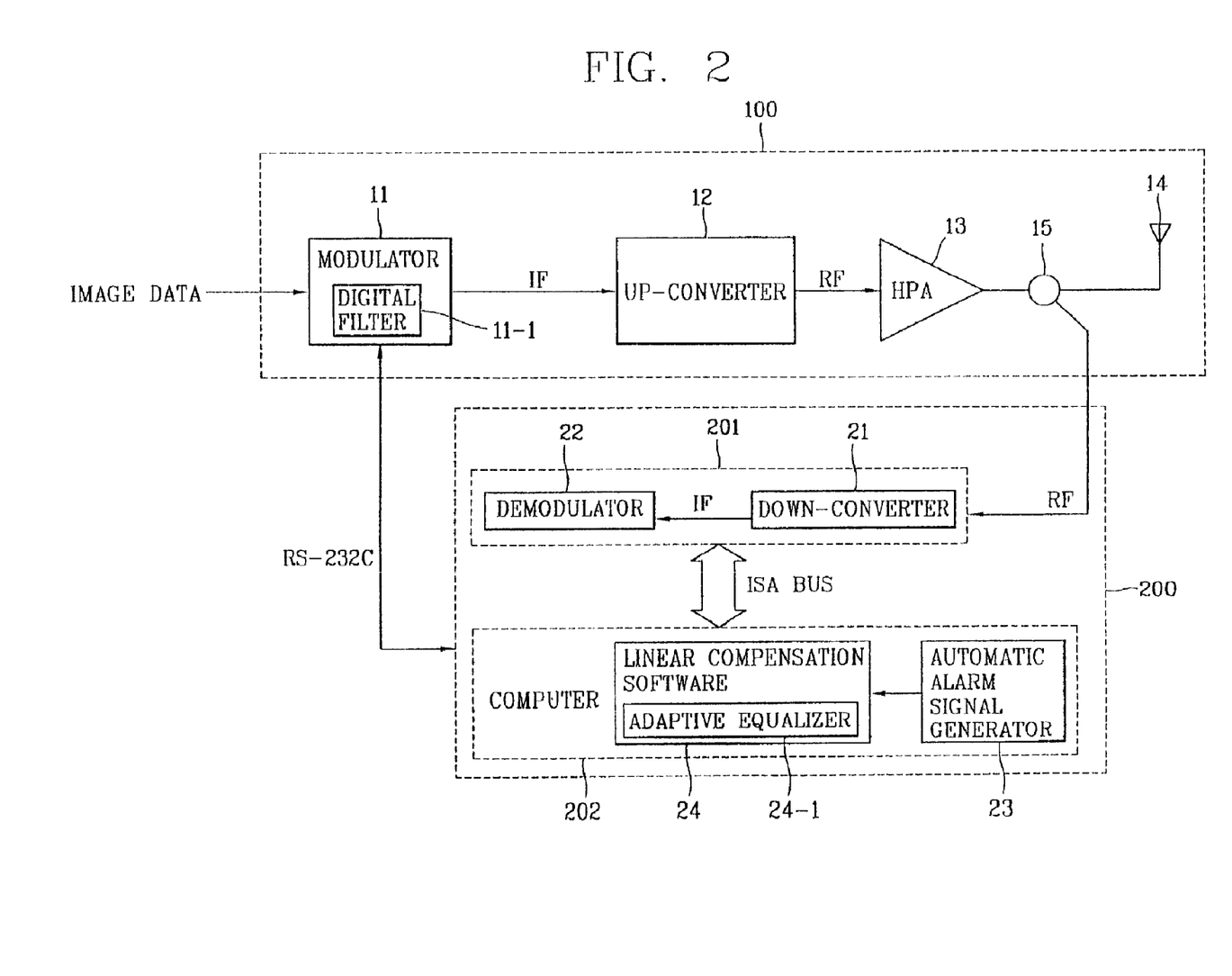
FIG. 2 is a schematic block diagram of a linear compensation system of a digital TV relay apparatus in accordance with a preferred embodiment of the present invention.

FIG. 2 is a schematic block diagram of a linear compensation system of a digital TV relay apparatus in accordance with a preferred embodiment of the present invention.

A linear compensation system of a digital TV relay apparatus of the preferred embodiment of FIG. 2 preferably includes a transmitting unit 100 and a linear compensation unit 200. Like the transmitting unit 10 of the related art, the transmitting unit 100 preferably includes a modulator 11, an up-converter 12, an HPA 13 and an antenna 14. The modulator 11 preferably includes a digital filter 11-1.

The linear compensation unit 200 preferably includes a correction board 201 to convert an output of the HPA 13 into an IF signal and demodulate the IF signal to a digital I/Q signal. The linear compensation unit 200 also preferably includes a computer 202 to receive the digital I/Q signal outputted from the correction board 201 through an industry standard architecture (ISA) or other bus, update a step size of an adaptive equalizer according to a signal-to-noise ratio (SNR) or an error vector magnitude (EVM), and generate a more accurate or optimum linear compensation coefficient.

The correction board 201 preferably includes a down-converter 21 to convert the output signal of the HPA 13 into an IF signal, and a demodulator 22 to demodulate the IF signal outputted from the down-converter 21 into a digital I/Q signal.

The computer 202 preferably includes an automatic alarm signal generator 23 to generate an automatic alarm signal if the SNR of the I/Q signal outputted from the demodulator 22 does not satisfy an advanced television systems committee (ATSC) or other standard. The computer 202 also preferably includes linear compensation software 24 to process an adaptive equalizer 24-1 according to the automatic alarm signal of the automatic alarm signal generator 23 and generate a linear compensation coefficient. In other embodiments, the linear compensation function may be accomplished in hardware or in firmware.

Operations of the preferred embodiment of the linear compensation system of a digital TV relay apparatus constructed as described above will now be described with reference to the accompanying drawings. The modulator 11 preferably modulates a broadcast signal of a baseband in an MPEG stream transmitted from a broadcasting station into an IF signal. In other embodiments, the broadcast signal may be in Quicktime™, Firmware™, DV™, AVI, Real Video, Windows Media, or other digital video format. The up-converter 12 preferably modulates the IF signal outputted from the modulator 11 into a RF signal.

The HPA 13 preferably amplifies the RF signal outputted from the up-converter 12 to a predetermined level and transmits it through the antenna 14 to a general subscriber. The digital filter 11-1 preferably distorts a broadcast signal with the inverse characteristic to the non-linear characteristic of the HPA 13 by using an initial linear compensation coefficient.

The output signal of the HPA 13 inevitably will include a distortion component because of the non-linearity of the HPA 13. Thus, the linear compensation unit 200 preferably receives the RF signal from the HPA 13 through a coupler 15 and updates a step size of the adaptive equalizer according to the SNR or the error vector magnitude (EVM) of the RF signal, to output the improved or optimum linear compensation coefficient to the digital filter 11-1.

Figure 3:
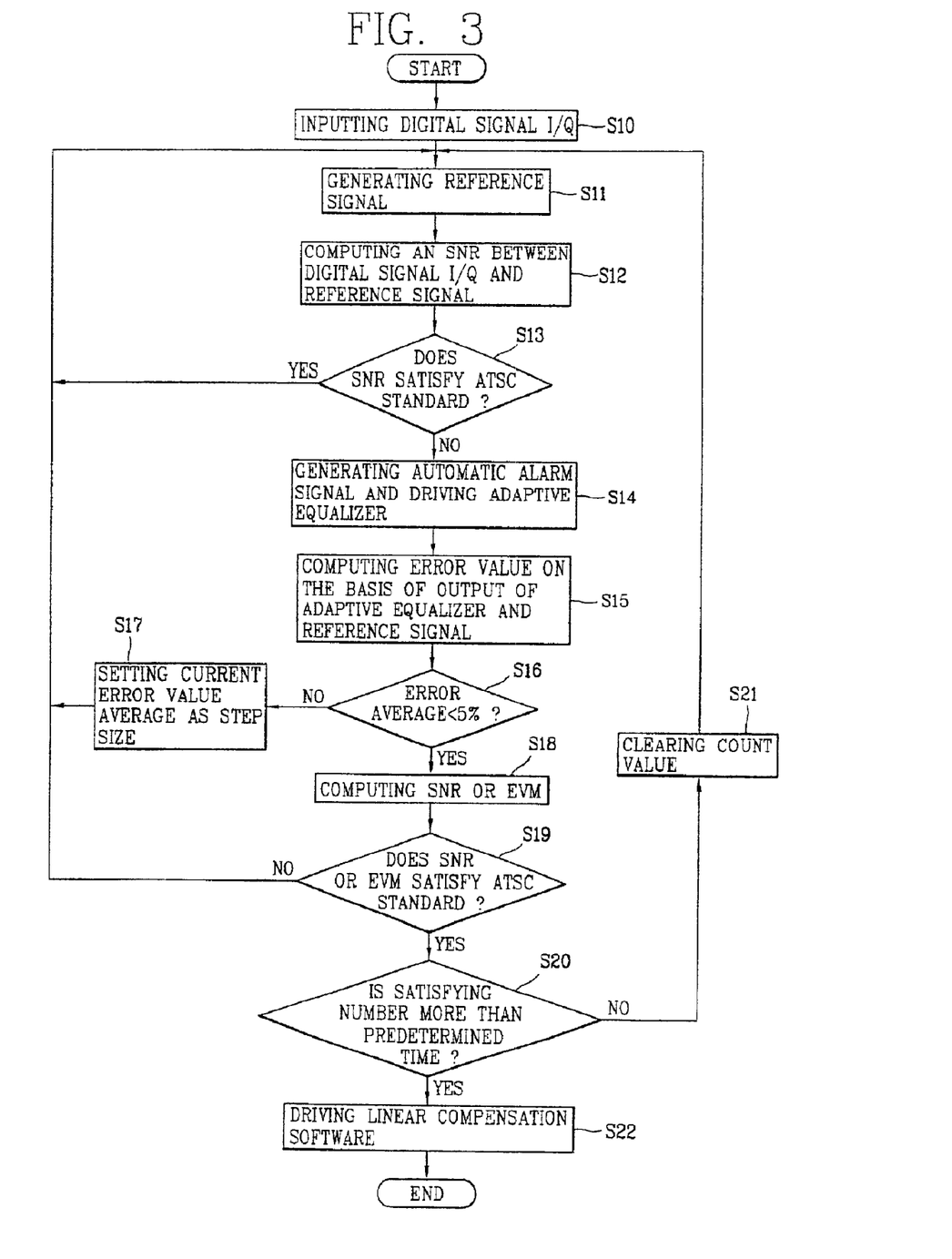
FIG. 3 is a flow chart of a linear compensation method of a digital TV relay apparatus in accordance with a preferred embodiment of the present invention.

FIG. 3 is a flow chart of a linear compensation method of a digital TV relay apparatus in accordance with a preferred embodiment of the present invention. The preferred embodiment of a linear compensation method can be used, for example, with the preferred embodiment of the linear compensation system as shown in FIG. 2. Operations of the linear compensation method will now be described with reference to FIG. 3 and the linear compensation unit 200. The correction board 201 converts the output signal of the HPA 13 into the IF signal and demodulates the IF signal into the digital I/Q signal of a baseband by using the down-converter 21 and the demodulator 22. The computer 202 preferably receives the digital I/Q signal through the ISA service or other bus and outputs a linear compensation coefficient required for the digital filter 11-1 of the modulator 11.

Figure 4A:
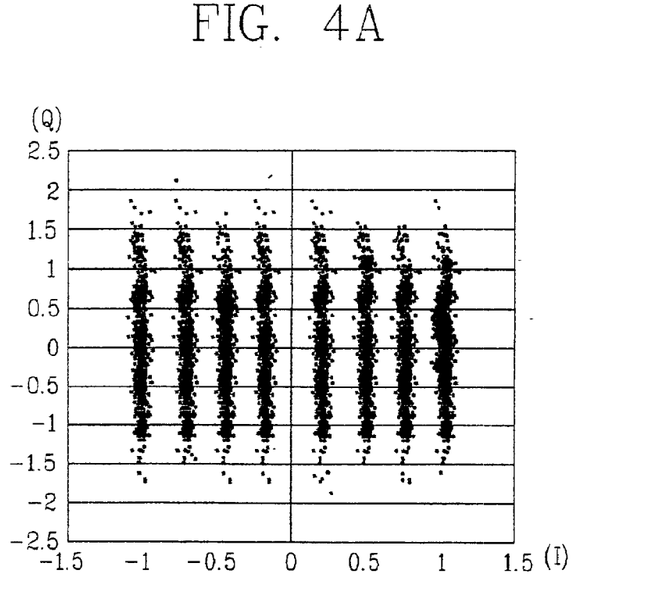
FIGS. 4A and 4B are graphs showing a digital I/Q signal outputted from a correction board and a reference signal generated by using the digital I/Q signal of FIG. 2, respectively, in accordance with a preferred embodiment of the present invention.
Figure 4B:
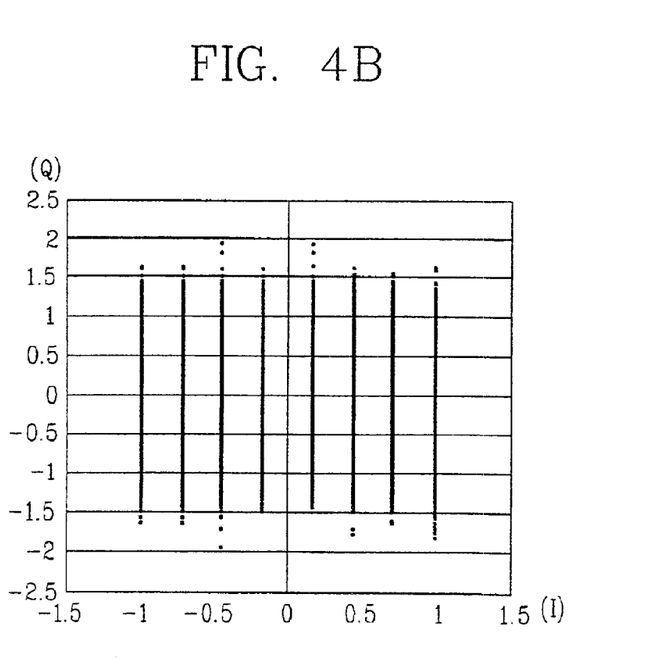

When the digital I/Q signals as shown in FIG. 4A are inputted through the ISA or other bus (step S10), the automatic alarm signal generator 23 preferably arranges the digital I/Q signals according to the input order, and produces 8 levels of reference signals as shown in FIG. 4B from the 'I' signal on the boundary of a middle value (step S11).

The SNR of the inputted Digital I/Q signals and the reference signals are preferably calculated (step S12) to determine whether the computed SNR satisfies the ATSC or other standard (step S13). If the SNR satisfies the ATSC or other standard, no automatic alarm signal is generated. If, however, the SNR does not satisfy the ATSC or other standard, an automatic alarm signal is preferably generated to trigger the adaptive equalizer 24-1 (step S14).

When the initial automatic alarm signal is inputted, the adaptive equalizer 24-1 preferably outputs 4096 digital 'I' signals by using the basic equalizer coefficient value, and the automatic alarm signal generator 23 preferably computes differences between the output values of the adaptive equalizer 24-1 and the reference signal (i.e. 4096 error values) and preferably computes an average value of the 4096 error values (step S15).

The automatic alarm signal generator 23 preferably determines whether the average of the currently computed error values is less than a predetermined value (e.g., 5%) of the average of the previously computed error values (step S16). If the average of the currently computed error values is greater than the predetermined value, then the automatic alarm signal generator updates the equalizer coefficient of the adaptive equalizer 24-1 using the corresponding average value as a step size for the next Digital I/Q signal inputted through the ISA or other bus.

Steps S11 through S16 are preferably repeated until the current average error value is less than the predetermined value (e.g. 5%) of the previously computed average error value. Then the automatic alarm signal generator 23 preferably fixes the corresponding average error value as the step size of the adaptive equalizer. Thus, in the present invention, the error value is reduced by varying the step size.

Once the step size is fixed, the automatic alarm signal generator 23 preferably calculates an SNR or an error vector magnitude (EVM) from equations (1) and (2) below by using an output value of the adaptive equalizer 24-1 and the reference signal generated according to the output value (step S18).

$$SNR = 20\log\left(\frac{\sum_{k=0}^{n-1}\sqrt{ref^2/k}}{\sum_{k=0}^{n-1}\sqrt{(ref-\text{input})^2/k}}\right) \qquad \text{equation (1)}$$

wherein 'ref' is a reference signal, and 'k' indicates the number of signals.

$$EVM = \left[10^{\frac{393-SNR}{20}}\right]\% \qquad \text{equation (2)}$$

When the SNR or the EVM of the digital I/Q signal are computed by equations (1) or (2), the automatic alarm signal generator 23 preferably determines whether the SNR or the EVM satisfies the ATSC or other standard (step S19). If the SNR or the EVM satisfy the ATSC or other standard, then the automatic alarm signal generator 23 preferably determines whether it has satisfied the ATSC or other standard by more than a predetermined number of successive times (i.e., 5 times) (step S20).

If the SNR or the EVM satisfies the ATSC or other standard by more than the predetermined number of successive times, then the automatic alarm signal generator 23 preferably stops generating the automatic alarm signal and outputs a coefficient generation signal to the linear compensation software 24 to drive the linear compensation software 24 (step S22). If, however, the SNR or the EVM does not satisfy the ATSC or other standard successively by more than the predetermined number of times, then a count value is preferably cleared (step S21) and returns to step S11. According to the ATSC standard, the EVM is not to be greater than −27 dB.

When a coefficient generation signal is inputted, the linear compensation software 24 preferably converts 32 equalizer coefficients inputted from the adaptive equalizer 24-1 into 288 coefficients and transmits them through an RS-232C or other link to the digital filter 11-1 of the modulator 11.

Figure 5A:
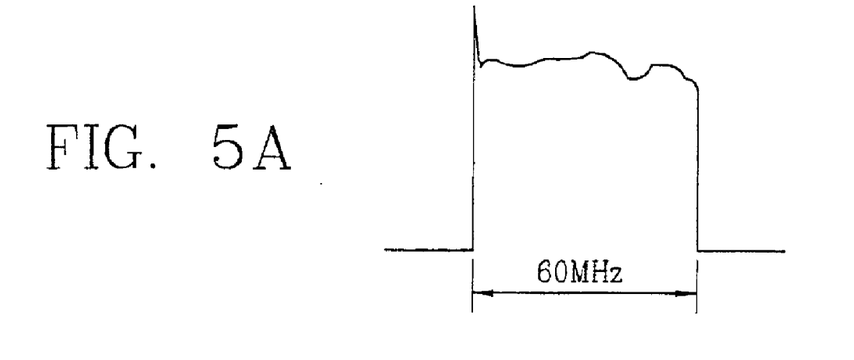
FIGS. 5A–5C are drawings illustrating signal characteristics for compensating a non-linear characteristic of FIG. 2 in accordance with a preferred embodiment of the present invention.
Figure 5B:
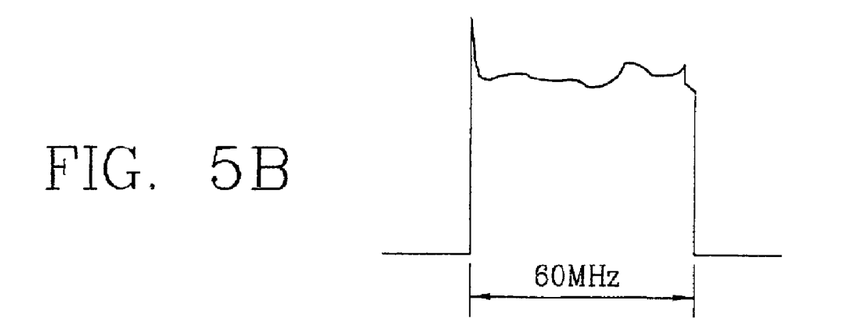
Figure 5C:
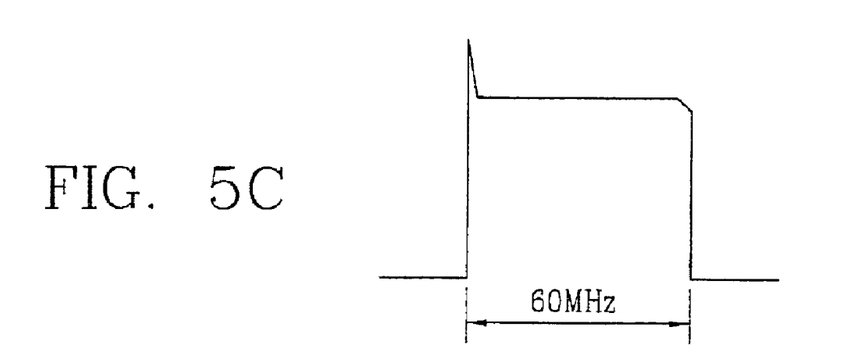

Accordingly, where the band characteristic of the output signal of the HPA 13 is as shown in FIG. 5A, the digital filter 11-1 preferably pre-distorts a frequency band of an image data to have the inverse characteristic to that of the output signal of the HPA 13 as shown in FIG. 5B according to the linear compensation coefficient outputted from the linear compensation software 24. Thus, the distortion-compensated digital TV signal as shown in FIG. 5C is preferably outputted through the antenna 14.

As described above, preferred embodiments of a linearization compensation system and method thereof for use in a digital TV relay apparatus or the like have various advantages. For example, since the convergence speed of the adaptive equalizer is improved so that the non-linearity of the HPA used in the digital TV transmitter or the digital TV relay apparatus can be quickly and effectively compensated. Further, since the step size of the adaptive equalizer is varied to select an improved or optimum step size and a linear compensation coefficient is generated by using an output of the adaptive equalizer generated according to the selected step size, the convergence speed of the adaptive equalizer can be increased, and an error value can be reduced. In addition, an improved or optimum linear compensation coefficient can be directly or automatically generated without an operator's manipulation. Moreover, a correction board can be easily inserted into the computer, so that the linear compensation system of a digital TV relay apparatus can be implemented at a low cost.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A linear compensation system, comprising:
   a transmitting unit configured to modulate a data to a first intermediate frequency (IF) signal, up convert the first IF signal to an RF signal, amplify the RF signal to a predetermined level using a power amplifier (PA) and transmit the amplified RF signal; and
   a linear compensation unit configured to vary a step size of an adaptive equalizer according to whether a signal-to-noise ratio (SNR) for an output signal of the PA satisfies a prescribed standard, and output a selected linear compensation coefficient to the modulator,
   wherein the linear compensation unit computes error values by determining differences between output values of the adaptive equalizer and a reference signal, computes an average error value of the computed error values, and variably varies the step size of the adaptive equalizer until a current error value if less than a predetermined value of a previous error value.

2. The system of claim 1, wherein the prescribed standard comprises a standard of the advanced television system committee, and wherein the linear compensation system is for use in a digital TV relay.

3. The system of claim 1, wherein the linear compensation unit comprises:
   a correction circuit configured to demodulate the output signal of the PA into a digital I/Q signal; and
   a computer configured to update the step size of the adaptive equalizer according to one of the SNR of the digital I/Q signal and an error vector magnitude (EVM) and further configured to generate the selected linear compensation coefficient.

4. The system of claim 3, wherein the correction circuit comprises:
   a down-converter configured to convert the output signal of the PA into a second IF signal; and
   a demodulator configured to demodulate the second IF signal outputted from the down-converter into the digital I/Q signal.

5. The system of claim 3, wherein the computer comprises:
   a linear compensation module having the adaptive equalizer, configured to convert coefficients of the adaptive equalizer and output a linear compensation coefficient and further configured to update the step size of the adaptive equalizer according to one of the SNR and the EVM of the digital I/Q signal outputted from the correction circuit; and
   an automatic alarm signal generator configured to control an operation of the adaptive equalizer and the linear compensation module.

6. The system of claim 5, wherein the linear compensation module comprises software.

7. The system of claim 5, wherein the automatic alarm signal generator is configured to generate an automatic alarm signal to drive the adaptive equalizer if a first SNR of the digital I/Q signal does not satisfy the prescribed standard.

8. The system of claim 7, wherein the automatic alarm signal generator updates the current error value average as the step size of the adaptive equalizer if the current error value average is not smaller than the previous error value average by more than the predetermined value after the automatic alarm signal is generated, and wherein the automatic alarm generator sets the current error value average as the step size of the adaptive equalizer if the current error value average is smaller than the previous error value average by more than the predetermined value.

9. The linear compensation system of claim 8, wherein the automatic alarm signal generator computes one of the SNR and the EVM for the output value of the adaptive equalizer when the step size is set, and stops the operation of the adaptive equalizer and operates the linear compensation module if one of the SNR and the EVM satisfy the standard for a predetermined consecutive number of times.

10. A linear compensation system, comprising:
    a transmitting unit configured to modulate an image data to a first intermediate frequency (IF) signal, up convert the first signal to an RF signal, amplify the RF signal to a prescribed level using a high powered amplifier (HPA), and transmit the amplified RF signal;
    a correction circuit configured to convert the output signal of the HPA to a digital I/Q signal; and
    a computer configured to receive the digital I/Q signal outputted from the correction circuit, update a step size of an adaptive equalizer according to one of a signal-to-noise ratio (SNR) for the output signal of the HPA and an error vector magnitude value (EVM), and output a linear compensation coefficient,
    wherein the computer computes error values by determining differences between output values of the adaptive equalizer and a reference signal, computes an average error value of the computed error values, and variably varies the step size of the adaptive equalizer until a current error value if less than a predetermined value of a previous error value.

11. The system of claim 10, wherein the correction circuit comprises:
    a down-converter configured to convert the output signal of the HPA into a second IF signal; and
    a demodulator configured to demodulate the second IF signal outputted from the down-converter into the digital I/Q signal.

12. The system of claim 11, wherein the computer comprises:
   a linear compensation module having the adaptive equalizer, and configured to convert coefficients of the adaptive equalizer and output the linear compensation coefficient; and
   an automatic alarm signal generator configured to update the step size of the adaptive equalizer according to one of the SNR and the EVM of the digital I/Q signal outputted from the correction circuit, and further configured to control operation of the adaptive equalizer and the linear compensation module.

13. The system of claim 12, wherein the linear compensation module comprises software.

14. The system of claim 12, wherein the automatic alarm signal generator generates an automatic alarm signal to drive the adaptive equalizer if the SNR of the digital I/Q signal does not satisfy a standard.

15. The system of claim 14, wherein the standard comprises a SNR prescribed by the advanced television system committee.

16. The system of claim 12, wherein the automatic alarm signal generator updates the current error value average as the step size of the adaptive equalizer if the current error value average is not smaller than the previous error value average by more than the predetermined value after an automatic alarm signal is generated, and further fixes the current error value average as the step size of the adaptive equalizer if the current error value average is smaller than the previous error value average by more than the predetermined value.

17. The system of claim 16, wherein the automatic alarm signal generator computes one of the SNR and the EVM for the output value of the adaptive equalizer when the step size is fixed, and stops the operation of the adaptive equalizer and operates the linear compensation module if said one of the SNR and the EVM satisfy a standard for a predetermined consecutive number of times.

18. The system of claim 17, wherein the standard comprised a standard of the advanced television system committee.

19. A linear compensating method in which an image data is modulated into an intermediate frequency (IF) signal by a modulator, converted to an RF signal, amplified to a prescribed level and outputted by an HPA, comprising:
   determining whether a first SNR for an output signal of the HPA satisfies a standard;
   computing an error value average for an output signal of an adaptive equalizer;
   fixing the computed error value average as a step size of the adaptive equalizer when the computed error value average is in a predetermined range;
   computing a second SNR; and
   converting a coefficient of the adaptive equalizer and compensating a non-linearity of the HPA where one of the second SNR and the EVM satisfy the standard by more than a predetermined number,
   wherein the predetermined range is less than a predetermined value of a previous error value average.

20. The method of claim 19, wherein the standard comprises a standard of the advanced television system committee.

21. A linear compensating method in which an image data is modulated into an intermediate frequency (IF) signal by a modulator, converted to an RF signal, amplified to a prescribed level and outputted by an HPA, comprising:
   determining whether a first SNR for an output signal of the HPA satisfies a standard;
   computing an error value average for an output signal of an adaptive equalizer;
   fixing the computed error value average as a step size of the adaptive equalizer when the computed error value average is in a predetermined range;
   computing a second SNR; and
   converting a coefficient of the adaptive equalizer and compensating a non-linearity of the HPA where one of the second SNR and the EVM satisfy the standard by more than a predetermined number,
   wherein computing an error value average comprises:
      converting the output signal of the HPA into a digital I/Q signal;
      comparing the digital I/Q signal with a reference signal and computing the first SNR;
      determining whether the first SNR as computed satisfies the standard;
      driving the adaptive equalizer if the first SNR does not satisfy the standard; and
      producing error values for the output signal of the adaptive equalizer and computing an average value of the produced error values.

22. A linear compensating method in which an image data is modulated into an intermediate frequency (IF) signal by a modulator, converted to an RF signal, amplified to a prescribed level and outputted by an HPA, comprising:
   determining whether a first SNR for an output signal of the HPA satisfies a standard;
   computing an error value average for an output signal of an adaptive equalizer;
   fixing the computed error value average as a step size of the adaptive equalizer when the computed error value average is in a predetermined range;
   computing a second SNR; and
   converting a coefficient of the adaptive equalizer and compensating a non-linearity of the HPA where one of the second SNR and the EVM satisfy the standard by more than a predetermined number,
   wherein computing the second SNR comprises:
      determining whether a current error value average is less than a predetermined value of a previous error value average;
      computing one of the second SNR and the EVM using the output signal of the adaptive equalizer if the current error value average is less than a predetermined value of the previous error value average; and
      setting the current error value average as the step size and updating the coefficient of the adaptive equalizer if the current error value average is not less than the predetermined value of the previous error value average.

23. The method of claim 22, wherein the second SNR is computed by the following mathematical equation:

$$SNR = 20\log\left(\frac{\sum_{k=0}^{n-1}\sqrt{ref^2/k}}{\sum_{k=0}^{n-1}\sqrt{(ref-\text{input})^2/k}}\right). \quad \text{equation (1)}$$

24. The method of claim 22, wherein the EVM is computed by the following mathematical equation:

$$EVM = \left[10^{\frac{393-SNR}{20}}\right]\%. \quad \text{equation (2)}$$

* * * * *